United States Patent [19]
Boudet et al.

[11] 3,761,208
[45] Sept. 25, 1973

[54] PRODUCTION OF CONTACT LENSES

[75] Inventors: Jean Boudet, Champigny;
Georges Wajs, Charenton;
Gerard Gomond, Paris;
Pierre Billault, Bry sur Marne,
all of France

[73] Assignee: Essilor International (Compagnie Generale D'Optique), Joinvalle Le Pont, France

[22] Filed: Oct. 15, 1971

[21] Appl. No.: 189,644

[30] Foreign Application Priority Data
Oct. 19, 1970  France .............................. 7037579

[52] U.S. Cl. .................... 425/352, 264/1, 425/808
[51] Int. Cl. ..................... B29c 1/06, B29d 11/00
[58] Field of Search ................. 425/352, 406, 415, 425/808; 264/1; 249/183

[56] References Cited
UNITED STATES PATENTS

| | | | |
|---|---|---|---|
| 2,479,935 | 8/1949 | Johnson | 264/1 |
| 3,005,234 | 10/1961 | Oriani et al. | 425/808 X |
| 3,248,460 | 4/1966 | Naujokas | 264/1 |
| 3,364,525 | 1/1968 | Davy et al. | 425/808 X |
| 3,404,861 | 10/1968 | Ewer | 425/808 X |
| 3,422,168 | 1/1969 | Bowser | 425/808 X |
| 3,423,488 | 1/1969 | Bowser | 425/90 X |
| 3,605,195 | 9/1971 | Campbell | 425/808 X |

*Primary Examiner*—R. Spencer Annear
*Attorney*—Irvin S. Thompson et al.

[57] ABSTRACT

A contact lens, particularly a flexible, silicone contact lens, is directly moulded with its final profile including a progressively tapered peripheral edge. The lens is moulded by complementary dies and an intermediate annular spacer provided on its inner periphery with a groove of concave cross-section.

4 Claims, 9 Drawing Figures

PATENTED SEP 25 1973　　　　　　　　　3,761,208
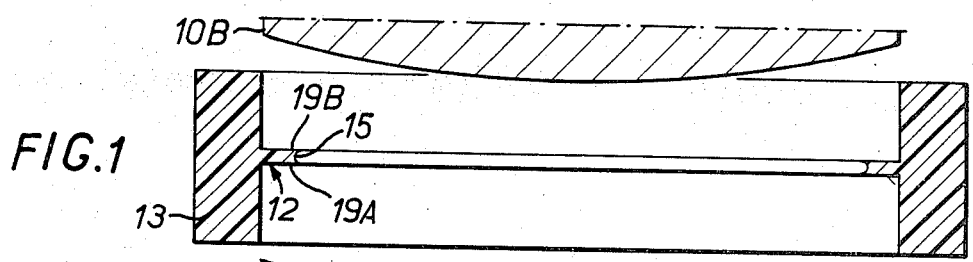
FIG.1
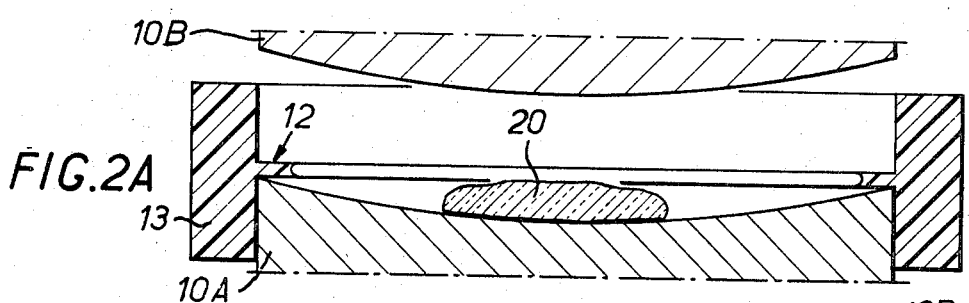
FIG.2A
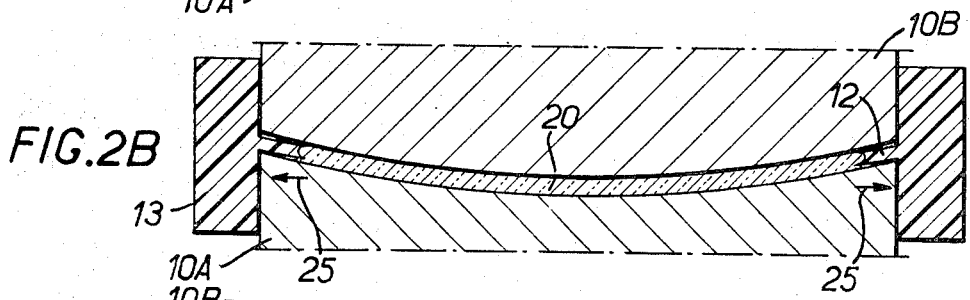
FIG.2B
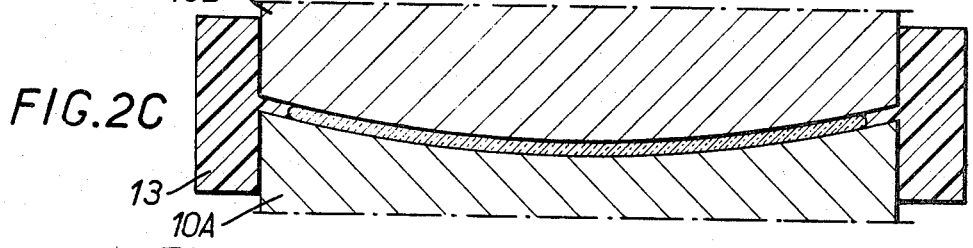
FIG.2C
FIG.3
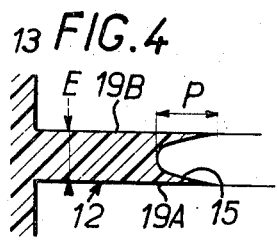
FIG.4
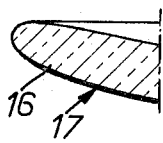
FIG.5
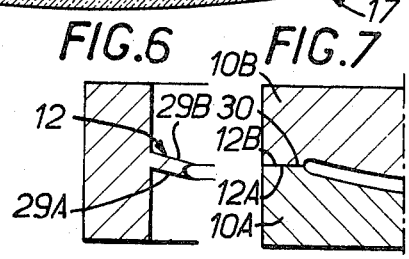
FIG.6　FIG.7

PRODUCTION OF CONTACT LENSES

BACKGROUND OF THE INVENTION

1. Field of the Invention

The present invention relates generally to the production of contact lenses, and refers more particularly but not exclusively to the production of lenses of flexible material.

2. Prior Art

Contact lenses manufactured up to the present time are usually of rigid material, and the process of manufacturing them comprises at least three stages, namely a first stage moulding the lens to a diameter larger than the final utilisation diameter, a second trimming stage enabling this diameter to be reduced to the desired final value, and a thrid machining stage which is necessary for giving the edge of the lens a suitable profile.

This third machining stage is particularly important, because the ability of the user to tolerate the lens for long periods depends at least partly on the result obtained.

Although this machining is relatively easy to effect in the case of contact lenses of rigid material, the same is not true of contact lenses of flexible material, particularly silicone contact lenses, since the flexible nature of these lenses in itself constitutes an obstacle to machining.

Various expedients have been proposed in order to overcome this difficulty. For example, it has been suggested to provide a lens of flexible material with temporary stiffness sufficient in principle to permit its machining, this being achieved for example by centrifuging or by refrigeration.

In practice, however, these expedients are scarcely adequate for permitting economic, continuous production, of flexible contact lenses, and it is for this reason that the above mentioned process has not been commercially exploited, despite the fact that in themselves these flexible lenses offer numerous advantages, due particularly to their greater tolerability in comparison with rigid contact lenses.

SUMMARY

According to the invention process for the manufacture of contact lenses of the kind having a progressively tapered peripheral edge comprises directly moulding a lens of this kind with the final profile desired for utilisation.

Preferably the process comprises depositing a slight excess of mouldable material of a concave moulding die and moving towards the latter a convex moulding die, while an annular moulding spacer is disposed between the two dies in order to form a moulding space corresponding to the desired lens profile, the spacer being provided with an annular groove which faces the aforesaid moulding space and has a concave cross-section forming a continuation of the aforesaid dies.

It is this groove which effects the direct moulding of the edges of the lens, thus making subsequent machining of the edges unnecessary.

In fact, it has been found that, particularly because of the compression of the mass of mouldable material, the excess portion of the latter is driven away laterally during the moulding, without any flash being formed which would require subsequent machining.

Thus, with the exception of subsequent physical or chemical treatment, a contact lens according to the invention is ready for use as soon as it is taken out of its mould.

Previously it has been proposed to dispose an annular seal between two moulding dies for moulding various optical lenses.

Quite apart from the fact that an arrangement of this kind has never hitherto been proposed for the moulding of contact lenses, and still less for the moulding of flexible contact lenses, this seal serves various purposes, none of which is equivalent to the purpose of the annular moulding spacer used in the process according to the invention.

A seal of this kind serves particularly for effecting the confinement of the moulding material and/or isolating the latter from the ambient air in order to avoid its pollution by the air. In no case has such a seal been used to effect by itself the moulding of the edge of a lens to the final profile desired for the lens, which is the effect achieved by the annular moulding spacer used in the process according to the invention.

In a preferred embodiment this annular moulding spacer is constructed separately of the associated moulding dies and is made of flexible material.

As the result of this arrangement an annular moulding spacer of this kind has the advantage of possessing a certain deformability, and consequently it is possible to use the same annular moulding spacer with various moulding dies having different radii of curvature.

In the case of the moulding of flexible contact lenses this arrangement is all the more advantageous because of the high tolerance capacities offered by these lenses, and with a reduced range of lenses of given radii of curvature, and therefore with a reduced range of corresponding moulding dies, it is possible to cover the entire range of usual cases of utilisation.

Furthermore, a moulding spacer of flexible material has the advantage of possessing a certain compressibility, thus assisting the compression of the moulding material during its moulding, and thereby aiding the achievement of correct moulding.

According to an alternative embodiment of the invention, the annular moulding spacer is formed of rigid material the shape of which very accurately matches the associated moulding dies.

Also according to the invention, the spacer may be formed of two parts, each of which is integral with one of the associated moulding dies.

In all cases, the process, mould, and annular moulding spacer according to the invention permit easy and economical manufacture of contact lenses, more particularly of contact lenses of flexible material.

DESCRIPTION OF THE DRAWINGS

FIG. 1 is a partial view in axial section of, by way of example, a mould according to the invention;

FIGS. 2A, 2B and 2C illustrate the various phases of utilisation of the mould shown in FIG. 1 for the purpose of manufacture of a contact lens according to the invention;

FIG. 3 is a view in axial section of a contact lens according to the invention;

FIG. 4 is a partial view on a larger scale of the annular moulding spacer of the mould shown in FIG. 1;

FIG. 5 is a partial view on the same scale as FIG. 4 of the edge of a lens as moulded with the aid of the moulding spacer;

FIG. 6 is a partial view of a mould similar to that shown in FIG. 1 but having an alternative construction of annular moulding spacer; and FIG. 7 is a partial view of a modified construction of mould according to the invention.

DESCRIPTION OF THE PREFERRED EMBODIMENTS

According to the embodiment illustrated in FIG. 1, a mould according to the invention comprises a concave moulding die 10A, a convex moulding die 10B, and an annular moulding spacer 12 intended to be interposed between these dies.

According to the embodiment illustrated, this annular moulding spacer 12 is integral with a cylindrical skirt 13 adapted to fit over both the concave moulding die 10A and the convex moulding 10B, the assembly comprising the spacer 12 and its skirt 13 being made of any suitable flexible material.

In the case e.g. of the manufacture of silicone contact lenses, for which the invention is more particularly but not exclusively intended, the annular moulding spacer 12 and its skirt 13 may for example be produced by moulding in any fluorinated elastomer, a product of this kind having the advantage of possessing no affinity with silicones.

Other materials may obviously be contemplated, such as a fluorinated synthetic resin or a polyethylene.

Generally speaking the material of the moulding spacer 12 should be selected in dependence on the material of the contact lens to be moulded, in order in particular to prevent any adhesion occurring between these two materials, which could make it difficult or even impossible for the lens to be removed from the mould.

In addition, the material of which the annular moulding spacer 12 should also be able to withstand the moulding temperature used for the contact lens required.

Obviously, both the moulding dies 10A, 10B and the inner periphery of the moulding spacer 12 have surface properties capable of giving the desired finish to a lens moulded between them.

However this may be, the annular moulding spacer 12 is provided on its inner periphery with an annular groove 15 of concave cross-section complementary to the final utilisation profile of the edge 16 of the lens 17 to be produced.

In FIG. 4 there will be observed the ideal glove finger profile characteristic of the groove 15 of a moulding spacer of this kind, but experience shows that simpler profiles, particularly a circular profile, may be suitable.

The depth P of the groove 15 may be about 0.15 mm for a thickness E of the annular moulding spacer 12 between its contact surfaces 19A, 19B, of about 0.03 mm.

In the example illustrated in FIGS. 1 to 4, the moulding spacer 12 of flexible material is bounded by plane surfaces 19A, 19B extending perpendicular to its axis, that is to say to the axis of its skirt, these surfaces being intended to come into contact with the dies 10A, 10B.

The moulding of a lens of this kind is conducted in the following manner.

The skirt 13 of the annular moulding spacer 12 is fitted over the concave moulding die 10A, FIG. 2A; a mass of mouldable material 20 constituting a slight excess is deposited on the die 10A; and the moulding dies 10A, 10B are moved relatively towards one another, thereby applying compression to the moulding material 20, the excess portion of the latter laterally escaping between the moulding dies 10A, 10B and the annular moulding spacer 12 as shown by the arrows 25 in FIG. 2B. Because of its original shape, the annular moulding spacer 12 in fact does not immediately come into contact with the moulding dies 10A, 10B but is progressively deformed when the latter are moved towards one another.

At the end of this process of moving the dies towards one another the convex surfaces 19A, 19B of the annular moulding spacer 12 closely fit the moulding dies 10A, 10B, and the inner surface of its groove 15 forms a continuation of the surface of these dies. The spacer 12 is then itself slightly in compression, its thickness being capable of a reduction of from 10 to 30 percent for example.

Experience has confirmed that no moulding plane is visible on the lens 17 obtained in this manner and the lens may be used without requiring any machining.

In the alternative embodiment illustrated in FIG. 6, the annular moulding spacer 12 is a spacer of rigid material, the shape of which is bounded by curved contact surfaces 29A, 29B corresponding in profile to the moulding dies with which a spacer of this kind is to cooperate.

According to the modified embodiment illustrated in FIG. 7, the annular moulding spacer 12 is formed of two independent parts 12A, 12B, each of which is respectively integral with the respective moulding dies 10A, 10B and adapted to operate with one another through a median moulding line 30.

Although the invention is intended primarily for the production of contact lenses of flexible material, the invention may also be applied to the moulding of contact lenses of rigid material.

We Claim:

1. A mould for the production of a contact lens of the kind having a progressively tapered peripheral edge, comprising a concave moulding die, a convex moulding die, and, between these dies, an annular moulding spacer of flexible material provided on its inner periphery with an annular groove of concave cross-section whose inner surface forms a continuation of the surface of the dies, the flexibility of the spacer and the size and shape of the groove being such that upon compression of an excess of moulding material in the mould between the dies, excess material escapes between the spacer and the dies, and upon further compression the sides of the spacer closely fit the dies so that upon demoulding, the lens has no moulding plane visible thereon.

2. A mould according to claim 1, wherein the annular moulding spacer is constructed separately of the dies.

3. A mould according to claim 1, wherein the annular moulding spacer is provided, opposite the dies, with plane contact surfaces perpendicular to its axis.

4. A mould according to claim 2, wherein the annular moulding spacer is carried by a cylindrical skirt enabling it to fit over at least one of the dies.

* * * * *